Patented Aug. 29, 1950

2,520,878

UNITED STATES PATENT OFFICE 2,520,878

METHOD OF PREPARING PRODUCTS FOR STORAGE AND PACKAGED PRODUCTS PRODUCED THEREBY

Robert H. Cotton, Orlando, Fla., and Albert L. Schroeder, Brookline, Mass., assignors to National Research Corporation, Boston, Mass., a corporation of Massachusetts No Drawing. Application August 19, 1947, Serial No. 769,534

12 Claims. (Cl. 99—171)

This invention relates to a process of preparing citrus fruit juices for storage and to the packaged product produced by the practice of the method.

As is well known, citrus fruit juices are subject to serious deterioration by internal chemical reactions when stored at normal temperatures in their natural, water-containing condition. It has been found that by desiccating these products to extremely low water content of less than 2% by weight moisture, the forces which produce deterioration are inhibited, so that storage for long periods in hermetically sealed containers at normal temperatures becomes possible, and the product can be reconstituted to a condition approaching its natural or fresh condition by restoration of its normal water content.

Desiccation to such low moisture content level by the methods heretofore available has been difficult and costly. The bulk of the moisture is readily removed by maintaining its vapor pressure above the surrounding pressure, either by heating under atmospheric conditions or by exposing the material to a vacuum, having a pressure below the vapor pressure of the moisture at a given operating temperature, and condensing or absorbing the evaporating moisture. The difficulty arises in the removal of the remaining, so-called "residual moisture," generally representing about 3 to 5% by weight of the product. For some reason, this residual moisture is extremely difficult to vaporize and remove, and progressively so, possibly because it is physically or chemically bound in some way to the solid particles or because the substantially dry, fluffy solid so insulates it that vaporizing heat reaches it only slowly and with great difficulty.

Removal of the residual moisture under atmospheric conditions is impracticable in most cases because prolonged heating to very high temperature would be required which would seriously injure the product. Under vacuum, the residual moisture can be removed and vacuum desiccation methods are practically universally used for the purpose. But even under vacuum, the removal of the residual moisture, that is, its reduction from about 3 to 5% to the level essential for proper keeping qualities, which is about 1.5% to 1.7% or less for most products, has been costly and difficult, requiring the maintenance of extremely low pressure and relatively high temperature for a very long period of time. For example, reduction of the residual moisture content from about 3% to about 1.5% by vacuum desiccation may take twice as long as the time required to remove all the moisture down to 3% by vacuum desiccation, even with the aid of lower pressure and higher temperature.

An object of the invention is to provide a novel method of preparing these products for storage which is quicker, easier and cheaper than prior methods but which produces a better product, more stable and able to retain its natural properties over longer periods of storage at ordinary temperatures. Another object is to provide a novel, storable package of these products, produced by the method and having the improved keeping qualities thereby obtainable. Other objects and advantages of the invention will hereinafter appear.

In the practice of the method of the invention we first subject the product to a suitable desiccation process, preferably vacuum desiccation, such as has been employed heretofore in preparing such products completely for storage. However, we do not continue the desiccation process until the residual moisture has been substantially removed to the 1.5% to 1.7% or less keeping level, as heretofore. Instead, the desiccation is continued only until the moisture content of the product is not less than 2% by weight nor more than about 5%.

After this desiccation step, the nearly dried product is hermetically sealed in a container (which may be of suitable form for consumer distribution of the product), either under vacuum or with a dry, inert gas such as nitrogen, together with a desiccant. The desiccant is preferably maintained out of contact with the product being treated, although associated in moisture-absorptive relation therewith, by placing it in a suitable receptacle, such as an air-permeable envelope of fabric, paper or the like. The hermetically sealed container is now treated in the same manner as a package of the product fully dried—that is, it may be shipped for consumer distribution or stored at normal temperature up to 100° F.

We have found that if a proper amount of desiccant is included in the sealed container a further dessication of the product takes place until the moisture content of the product is ultimately reduced to about 1.5% to 1.7% or below. This further desiccation due to the action of the desiccant takes place very gradually, generally requiring a period of weeks or months, during which the same product, dried to between 2% and 5% water content and stored under the same conditions but without the desiccant, would deteriorate markedly. Strangely, however, the presence of the desiccant effectively prevents the deterioration that would otherwise take place due to the presence in the product of more than the critical moisture content. In fact, we have found that products treated by our method actually keep better, with less chemical change taking place, than products dried to 1.5% or less moisture content and then packaged and stored in the same manner but without the desiccant.

The saving in cost of desiccating which our process effects is very substantial. Thus by removing less of the residual moisture than was previously necessary, the time required for the desiccating prior to packaging is greatly reduced and may be only one-third the time required to desiccate the product to 1.5% to 1.7% moisture content prior to packaging. The saving in cost thus effected much more than offsets the cost of the chemical desiccant.

In addition to this saving, the product is better than one which is desiccated to about 1.5% moisture content or less and packaged without a desiccant. As above stated, it keeps better, retaining its fresh properties longer. It is less subject to caking than the completely desiccated product, it does not change color so readily and it retains its normal taste and smell better.

Any suitable desiccant may be employed, such as dry alumina, silica, calcium sulfate or combinations thereof. Particularly good results have been obtained with a coprecipitated combination of silica and alumina in the form of small beads (average diameter about 0.138 inch), having a moisture absorption capacity of about 39% of its weight at relative humidity of 80%, and a residual moisture content (remaining after prolonged heating at 400° F.) of about 1% to 4% by weight. This desiccant is not only very efficient but where the product being treated is a food product, particularly one of the citrus juices, it lacks the tendency which other desiccants have to produce off-odors during long periods of storage.

The amount of desiccant which should be employed is a variable, depending on the amount of moisture remaining in the product at the time of packaging, the absorptive capacity of the desiccant employed and the maximum anticipated storage time. The amount should be sufficient to reduce the moisture content of the product below the critical keeping level, usually to about 1.7% or less, before an equilibrium condition is reached, although, as previously stated, this reduction may require a matter of weeks or months. When using one of the desiccants above-mentioned and packaging a product having 2 to 3% moisture content, we have found that about 10 to 30%, preferably 25 to 30%, by weight of desiccant to the weight of the product in the container is adequate for periods of storage of about 30 to 40 weeks. Where more moisture is contained in the product at the time of packaging, more desiccant is needed, a product having about 5% moisture needing about 70% by weight of the desiccant. Likewise, for longer periods of storage it is advisable to employ more desiccant.

We prefer to conduct the initial desiccation step to leave about 2 to 3% moisture in the product because desiccation to this moisture content level can be effected relatively quickly and easily by ordinary vacuum desiccation methods and less desiccant is required than if the product contains as much as 5% water at the time of packaging. The saving in preliminary desiccating time as between removing to a 3 to 5% moisture content and to a 2 to 3% moisture content is not ordinarily sufficient to justify the added cost of desiccant in the former case.

A typical application of the process, for the production of packaged orange juice powder of high stability under normal storage conditions, was as follows:

Fresh orange juice, concentrated to about 50% solids, was subjected to vacuum desiccation until the moisture content, as determined by the Karl Fischer reagent, was between 2.5 and 3% by weight. The powder was placed in small cans while maintained in an atmosphere of dry nitrogen and a quantity of activated silica-alumina desiccant beads, equal to about 15% of the weight of the powder, was placed in each can, the desiccant being contained in a moisture-pervious envelope of fibrous material. The cans were then hermetically sealed while the dry nitrogen atmosphere was maintained therein.

For comparison, two other portions of the orange juice were vacuum desiccated by the same process until their moisture content, as determined by the Karl Fischer reagent, was respectively 1.86% and 1.57%. The so desiccated powder was then packed in the same type containers in a dry nitrogen atmosphere but without a desiccant and the containers were hermetically sealed.

The cans of powders were then stored at a temperature of 100° F. (adverse storage conditions, making a rigorous test) and samples were tested and compared for ascorbic acid content, physical condition, taste, etc., at intervals for 39 weeks.

The ascorbic acid content of all samples declined from about 2.3 milligrams per gram to about 2 milligrams per gram in the first six weeks. Thereafter, the ascorbic acid content of the powder dried to 1.86% moisture fell off sharply to about 1.4 milligrams per gram in 18 weeks total storage and continued to decline to about 0.6 milligram per gram in 39 weeks total storage. The ascorbic acid content of the product dried to 1.57% moisture declined to about 1.6 milligrams per gram in 18 weeks total storage, to about 1.5 milligrams per gram in 26 weeks total storage and then fell sharply to about 0.6 milligram per gram in 39 weeks total storage. The ascorbic acid content of the product prepared according to the process of the invention, the cans whereof contained the desiccant, declined only to about 2 milligrams per gram in 18 weeks total storage and thereafter fell slowly to about 1.3 milligrams per gram in 39 weeks total storage.

Thus, the ascorbic acid content of the product processed according to the invention was more than twice as great as that of the comparative products after 39 weeks of storage.

After only three weeks of storage the powder dried to 1.86% moisture content and canned without desiccant had caked into a hard mass which could not be broken up with a spatula, a condition unacceptable for consumer distribution because of difficulty of reconstituting as juice by the addition of water. After 9 weeks, the two other products had formed a light cake, readily broken up by spatula, suitable for consumer use. This condition was retained by both products substantially unchanged for the next 8 weeks after which the sample desiccated to 1.57% moisture content began to cake badly and its condition had become unacceptable by the 24th week. The product processed according to the invention retained its light cake form from the 9th week to the 25th week, after which the cake began to harden, reaching the border-line of salability by the 39th week.

Both products stored without desiccant darkened noticeably from bright yellow to brownish orange and finally to brown and this change of color was apparent in the reconstituted juice. The product processed according to the invention had little if any of this undesirable color change. The taste rating of the latter product was at least as good at all stages as that of the product desiccated to 1.57% moisture content and definitely better than that of the other product.

The following table shows moisture content determinations (Karl Fischer reagent) over periods of storage up to 22 weeks at 70° to 90° F. for orange juice powders dried initially to water contents of 2.47% and 2.0% respectively and canned in a dry nitrogen atmosphere with different amounts of desiccant (silica-alumina beads):

| Storage Time At 70°–90° F. | Per Cent by Weight of Desiccant | | | |
|---|---|---|---|---|
| | 13 | 26 | 13 | 26 |
| | Moisture Content (Per Cent by Weight) | | | |
| 0 | 2.47 | 2.47 | 2.00 | 2.00 |
| 3 weeks | 1.93 | 1.60 | 1.32 | 1.33 |
| 10 weeks | 1.81 | 1.38 | 1.30 | 1.07 |
| 18 weeks | 1.67 | 1.25 | 1.14 | 0.90 |
| 22 weeks | 1.91 | 1.42 | 1.41 | 1.10 |

It will be noted that the moisture content of all samples dropped to a low in about 18 weeks and then began to rise. The explanation of this ultimate rise is believed to be that as time goes on a chemical reaction takes place in the product which breaks down the sugar, releasing water. This water is removed and absorbed by the desiccant until the latter reaches its capacity at the relative humidity in the can, after which the moisture in the product begins to increase slowly with time. For this reason, where the anticipated period of storage is very long, for example more than a year, it is advisable to employ a higher percentage of the desiccant than is necessary to effect an initial reduction of the water content into the safe storage range.

Comparable results to those above set forth have been obtained using other disiccants such as dry alumina, silica or calcium sulfate except that the desiccants had a tendency to produce off-odors, while the product stored with the silica-alumina desiccant was free of such odors.

The process is applicable with like advantageous effects to other citrus juices.

Moisture content values herein given are as determined with the Karl Fischer reagent, the most accurate method presently known to us for making such measurements. This method is described fully in an article by Wernimont and Hopkinson, "The Dead-Stop End Point as Applied to the Karl Fischer Method for Determining Moisture," Industrial & Engineering Chemistry, vol. 15, 1943, page 27. Determinations by the vacuum oven method are generally about 60 to 70% those obtained by the Fischer method.

We claim:

1. The process of preparing citrus fruit juice for storage which comprises subjecting the juice to vacuum desiccation until it is reduced to a solid powder having a moisture content of from 2% to 5% by weight, then hermetically sealing said powder in a container free from moisture vapor together with a desiccant exposed in moisture-absorptive relation to said powder but out of physical contact therewith, said desiccant acting during long periods of storage to effect removal and absorption of further moisture from said powder and to preserve said powder against chemical deterioration and caking which would otherwise take place in storage of said container at normal temperature.

2. A package of the substantially desiccated solids of a citrus fruit juice comprising an hermetically sealed container containing said solids and a supply of a desiccant exposed in moisture absorptive relation to said solids but out of physical contact therewith, the total moisture content of said solids plus any moisture absorbed therefrom by said desiccant being between 2% and 5% by weight of said solids, said desiccant acting to reduce chemical deterioration and caking of said solids during long periods of storage of said sealed container at normal temperature.

3. A package of the substantially desiccated solids of orange juice comprising an hermetically sealed container containing said solids and a supply of a desiccant exposed in moisture-absorptive relation to said solids but out of physical contact therewith, the total moisture content of said solids plus any moisture absorbed therefrom by said desiccant being between 2% and 5% by weight of said solids, said desiccant acting to reduce chemical deterioration and caking of said solids during long periods of storage of said sealed container at normal temperature.

4. The process of preparing orange juice for storage which comprises subjecting the juice to vacuum desiccation until it is reduced to a solid powder having a moisture content of from 2%–3% by weight, then hermetically sealing said powder in a container free from moisture vapor together with a desiccant comprising activated silica and alumina exposed in moisture-absorptive relation to said powder but out of physical contact therewith, said desiccant acting during long periods of storage to effect removal and absorption of further moisture from said powder and to preserve said power from chemical deterioration and caking which would otherwise take place in storage in said container at normal temperature.

5. The process of preparing orange juice for storage which comprises subjecting the juice to vacuum desiccation until it is reduced to a solid powder having a moisture content of from 2%–3% by weight, then hermetically sealing said powder in a container free from moisture vapor together with activated alumina exposed in moisture-absorptive relation to said powder but out of physical contact therewith, said diesiccant acting during long periods of storage to effect removal and absorption of further moisture from said powder and to preserve said powder from chemical deterioration and caking which would otherwise take place in storage in said container at normal temperature.

6. The process of preparing orange juice for storage which comprises subjecting the juice to vacuum desiccation until it is reduced to a solid powder having a moisture content of from 2%–3% by weight, then hermetically sealing said powder in a container free from moisture vapor together with anhydrous calcium sulphate exposed in moisture-absorptive relation to said powder but out of physical contact therewith, said desiccant acting during long periods of storage to effect removal and absorption of further moisture from said powder and to preserve said powder from chemical deterioration and caking which would otherwise take place in storage in said container at normal temperature.

7. The process of preparing orange juice for storage which comprises subjecting the juice to vacuum desiccation until it is reduced to a solid powder having a moisture content of from 2%–3% by weight, then hermetically sealing said powder in a container free from moisture vapor together with activated silica exposed in moisture-absorptive relation to said powder but out of physical contact therewith, said desiccant acting during long periods of storage to effect removal and absorption of further moisture from said powder and to preserve said powder from chemical deterioration and caking which would otherwise take place in storage in said container at normal temperature.

8. A package of the substantially desiccated solids of orange juice including an hermetically sealed container containing said solids and a supply of a desiccant comprising activated silica and alumina exposed in moisture-absorptive relation to said solids but out of physical contact therewith, the total moisture content of said solids plus any moisture absorbed therefrom by said desiccant between 2% and 3% by weight of said solids, said desiccant acting to reduce chemical deterioration and caking of said solids during long periods of storage of said sealed container at normal temperature.

9. A package of the substantially desiccated solids of orange juice including an hermetically sealed container containing said solids and a supply of activated alumina exposed in moisture-absorptive relation to said solids but out of physical contact therewith, the total moisture content of said solids plus any moisture absorbed therefrom by said desiccant being between 2% and 3% by weight of said solids, said desiccant acting to reduce chemical deterioration and caking of said solids during long periods of storage of said sealed container at normal temperature.

10. A package of the substantially desiccated solids of orange juice including an hermetically sealed container containing said solids and a supply of anhydrous calcium sulphate exposed in moisture-absorptive relation to said solids but out of physical contact therewith, the total moisture content of said solids plus any moisture absorbed therefrom by said desiccant being between 2% and 3% by weight of said solids, said desiccant acting to reduce chemical deterioration and caking of said solids during long periods of storage of said sealed container at normal temperature.

11. A package of the substantially desiccated solids of orange juice including an hermetically sealed container containing said solids and a supply of activated silica exposed in moisture-absorptive relation to said solids but out of physical contact therewith, the total moisture content of said solids plus any moisture absorbed therefrom by said desiccant being between 2% and 3% by weight of said solids, said desiccant acting to reduce chemical deterioration and caking of said solids during long periods of storage of said sealed container at normal temperature.

12. The process of preparing orange juice for storage which comprises subjecting the juice to desiccation until it is reduced to a solid powder having a moisture content of from 2–5% by weight, then hermetically sealing said powder in a container free from moisture vapor together with a desiccant exposed in moisture-absorptive relation to said powder, said desiccant acting during long periods of storage to effect removal and absorption of further moisture from said powder and to preserve said powder against chemical deterioration and caking which would otherwise take place in storage of said container at normal temperature.

ROBERT H. COTTON.
ALBERT L. SCHROEDER.

REFERENCES CITED

The following references are of record in the file of this patent:

UNITED STATES PATENTS

| Number | Name | Date |
|---|---|---|
| 1,222,656 | Moyer | Apr. 17, 1917 |
| 1,532,831 | Mastin | Apr. 7, 1925 |
| 1,657,272 | Neusbaum | Jan. 24, 1928 |
| 2,225,627 | Flosdorf | Dec. 24, 1940 |

Certificate of Correction

Patent No. 2,520,578                                     August 29, 1950

ROBERT H. COTTON ET AL.

It is hereby certified that error appears in the printed specification of the above numbered patent requiring correction as follows:

Column 3, line 36, before the word "relative" insert *a*; column 5, line 54, for "disiccants" read *desiccants*; column 6, line 51, for "power" read *powder*; line 62, for "diesiccant" read *desiccant*; column 7, line 32, before "between" insert *being*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*